Patented June 13, 1939

2,162,609

UNITED STATES PATENT OFFICE 2,162,609

ANIMAL FEED

Charles Coleman Dawe, Chicago, Ill.

No Drawing. Application December 17, 1937,
Serial No. 180,445

8 Claims. (Cl. 99—4)

This invention relates to improvements in animal feeds such as poultry or stock feed and, more particularly, relates to feed in a compressed or pelleted form and process of preparing the same.

The present invention is a novel improvement over my prior Patent No. 1,867,063 which relates generally to animal feed comprising food particles suspended in a relatively large quantity of water by means of bentonite. Conversely of my earlier invention, the present invention relates generally to a compressed or pelleted animal feed having water uniformly suspended throughout a relatively large quantity of feed particles.

In conventional processes of forming pellets or cubes of animal feed particles, molasses is popularly employed as a binder. A molasses binder has many disadvantages, notably, during warm weather or under handling in warm warehouses or box cars, the pellets break down and become sticky to the point of causing the entire mass to cake. Further, molasses tends to clog the forming dies and the necessary special molasses mixing equipment slows the process of mixing and pelleting.

The product and process of the present invention avoids the use of binders of molasses and like material and avoids the foregoing and other attendant disadvantages thereof. The binder herein contemplated is selected from the class of hydro-silicates of aluminum which have colloid or jell-forming properties, representative of which class of materials is bentonite. Such materials have relatively great absorptive and adhesive properties, and when employed as a binder for compressed or pelleted animal feed particles, the process of manufacturing is greatly simplified and the product resulting is superior to those heretofore produced.

In contrast with molasses and similar binders, hydro-silicates of aluminum, such as bentonite, may be in the form of a dry free flowing powder which may be readily mixed with the dry feed particles without any special mixing equipment. The bentonite or similar binder material is activated by only a relatively small quantity of added moisture and, because of the adhesive properties thereof, only a minimum amount of heat and pressure is required to form the pellets. In the foregoing respects, in addition to others hereinafter apparent, the process of the present invention is an important improvement over prior processes of making animal feed pellets.

Features characterizing the superiority of the product of the present invention are, more particularly; the pellets are relatively firm and durable so that likelihood of mealing and crumbling during various handling operations thereof is very materially reduced as is likelihood of deterioration, disintegration and contamination as when, for example, the pellets are thrown on the ground for range feeding; the pellets are free from stickiness and not generally subject to deterioration from temperature conditions; hydro-silicates of aluminum such as bentonite, in addition to their improved physical properties as binders, are tasteless, odorless and possess useful medicinal properties which improve the quality of the animal feed mixtures with which they may be employed; the pellets are superior in a nutritive standpoint in that the bentonite or similar material provides a coating for the feed particles which prevents rapid oxidation of the vitamin content of the feed during storage and handling and further in that the bentonite or similar material absorbs the superficial moisture thus preventing the moisture from attacking the protein, fats and carbohydrates and resulting rancidity, molding and free fatty acid formation in the product; and such other features of improvements over prior compressed or pelleted animal feeds as will be readily apparent from inspection and use thereof.

The dry feed particles which comprise a component of the mixture contemplated by this invention may be a balanced ration adaptable for nourishing and/or fattening poultry or livestock or may be by-products such as waste fruits, vegetable pulp, potato peel pulp, charcoal or other vegetable or grain by-products or mineral salts or any other animal feed material which it is desirable to bind together in a compressed or pelleted form.

In my preferred process I mix together bentonite or other jell-forming hydro-silicate of aluminum or mixtures thereof and feed materials such as above described, preferably while in a dry state. More particularly, I have found that only a small proportion of binder is necessary and for example, a mixture comprising 2% bentonite and 98% dry feed produces very efficient results. The feed particles and binder are preferably thoroughly mixed and thereafter subjected to superficial moisture as by water spray or steam or the mixing and moistening may be effected in a single operation preferably in conjunction with agitation to promote a thorough mixing.

The bentonite or other jell-forming hydro-silicates of aluminum absorbs the added moisture and takes on adhesive properties so that when the moistened mixture is compressed in any conventional pellet forming device or otherwise, the resulting mass contains feed particles which are coated and bound by the moisture absorbed jell-forming bentonite or similar material and the relatively small quantity of added water is found to be uniformly suspended throughout the body of feed particles.

A certain amount of moisture is essential in the making of feed pellets generally, but I have found that the amount of superficial moisture necessary in my process is relatively small and the moistening and pellet forming operations may accordingly be effected simply and rapidly.

It is understood that various modifications of the invention may be effected without departing from the spirit and scope thereof as defined in the appended claims.

What I claim is:

1. A poultry or stock feed comprising a compressed mass of food particles having a binder of a jell-forming hydro-silicate of aluminum.

2. A poultry or stock feed comprising a compressed mass of food particles having a binder of bentonite.

3. A poultry or stock feed comprising a compressed mass of food particles having a binder of bentonite in the proportion of approximately 2% to dry feed.

4. A poultry or stock feed material which comprises dry food particles having approximately 2% of a jell-forming hydro-silicate of aluminum in admixture therewith said hydro-silicate of aluminum forming a binder when the material is moistened and compressed.

5. A poultry or stock feed material which comprises dry food particles having approximately 2% of bentonite in admixture therewith said bentonite forming a binder when the material is moistened and compressed.

6. A process for preparing a poultry or stock feed comprising mixing a jell-forming hydro-silicate of aluminum with the dry food particles, moistening the mixture and permitting the hydro-silicate of aluminum to absorb at least a portion of said moisture, and forming the mixture into pellets.

7. A process for preparing a poultry or stock feed comprising mixing bentonite with the dry food particles, moistening the mixture and permitting the bentonite to absorb at least a portion of said moisture, and forming the mixture into pellets.

8. A process for preparing a poultry or stock feed comprising, mixing with dry food particles a small quantity such as 2% of bentonite, moistening the mixture and permitting the bentonite to absorb at least a portion of said moisture, and forming the mixture into pellets.

CHARLES C. DAWE.